United States Patent Office 3,446,203
Patented May 27, 1969

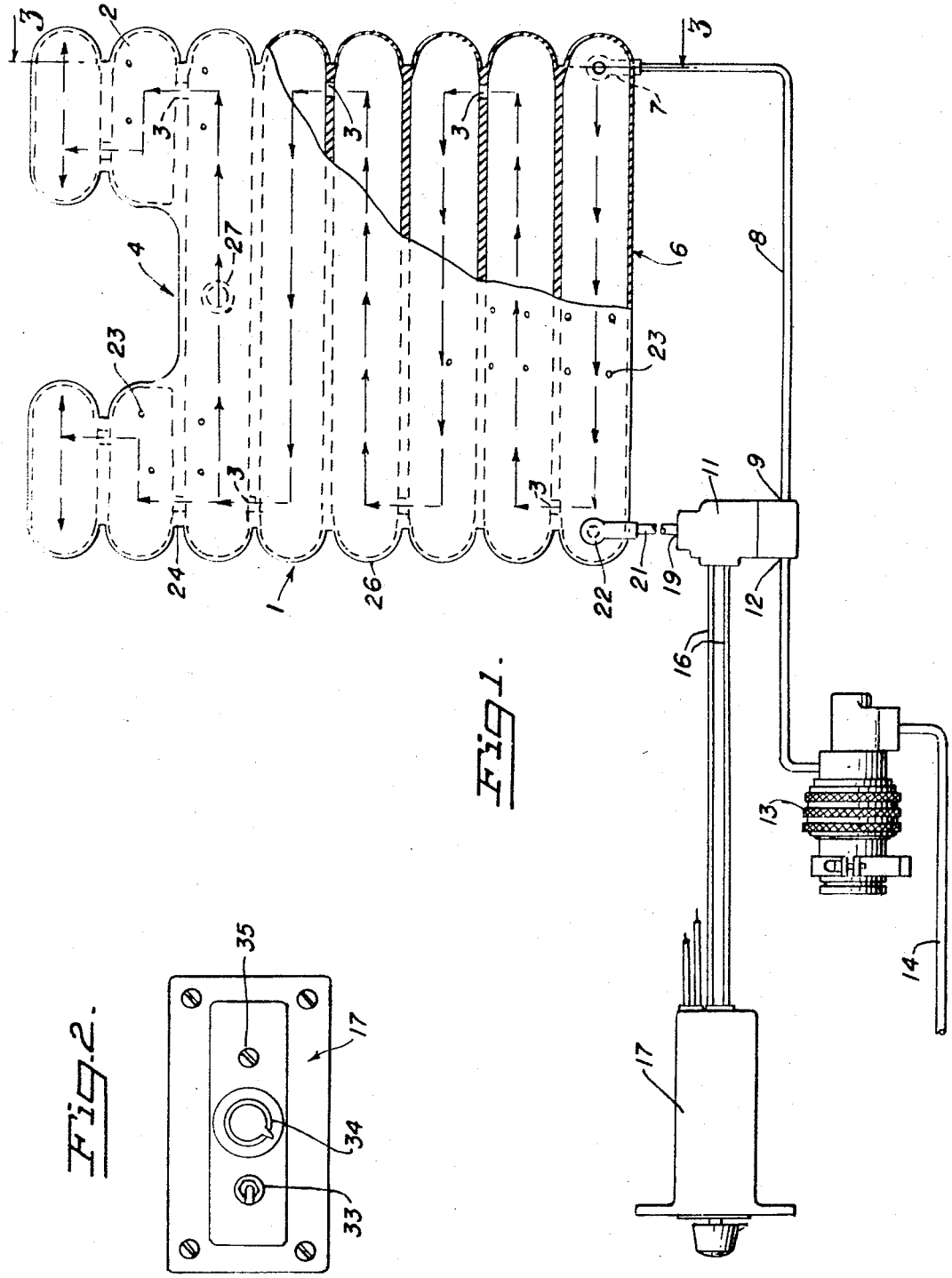

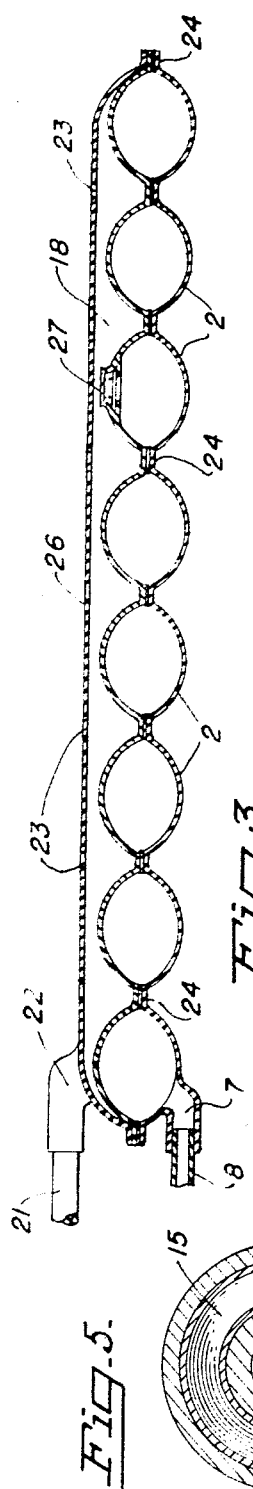
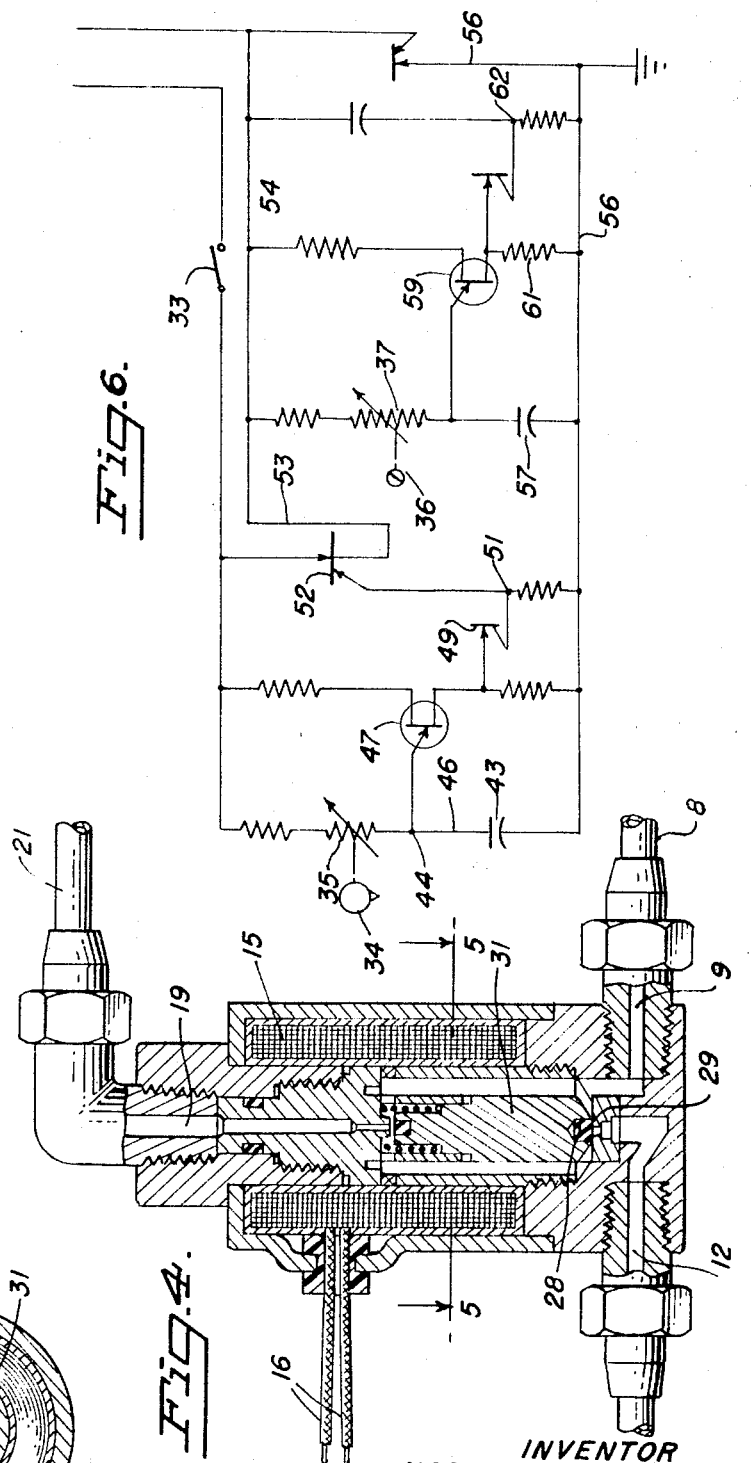

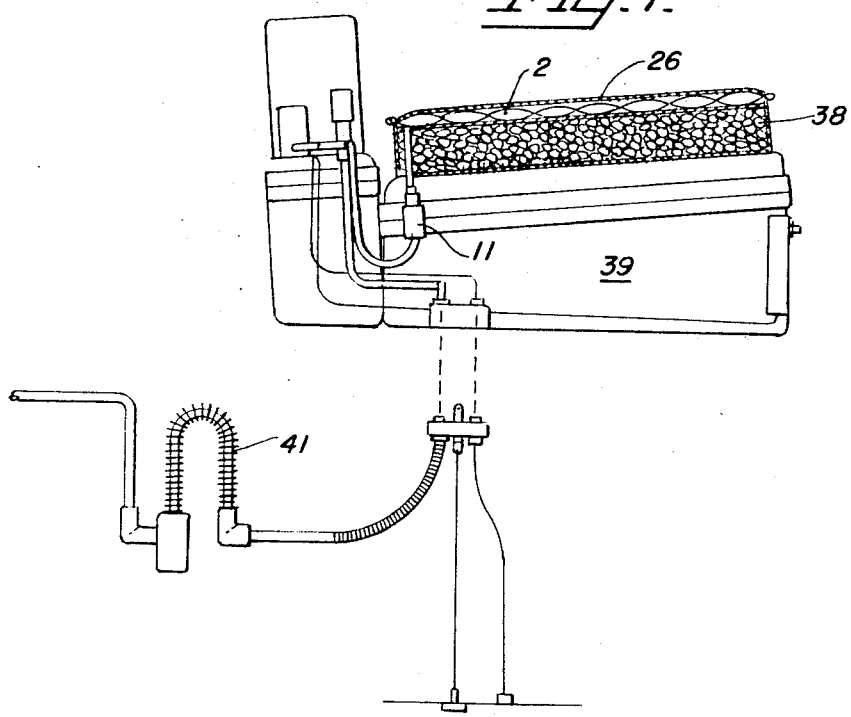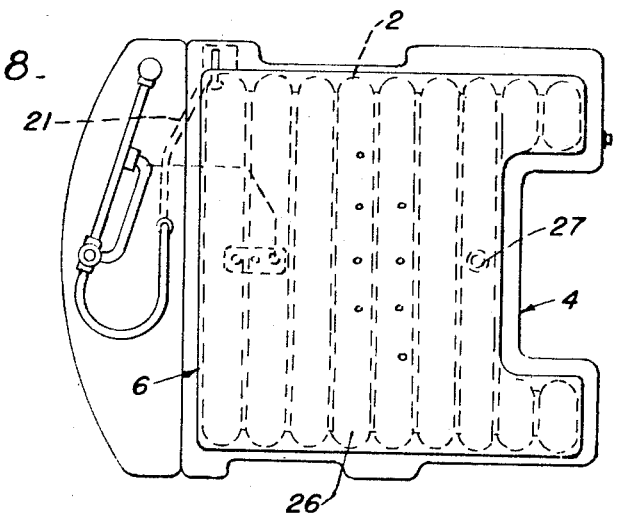

3,446,203
PNEUMATIC STIMULATOR CUSHION
Norris N. Murray, San Bruno, Calif., assignor to H. Koch & Sons Inc., Corte Madera, Calif., a corporation of California
Filed Feb. 6, 1967, Ser. No. 614,292
Int. Cl. A61h 21/00, 1/00
U.S. Cl. 128—24.2         10 Claims

ABSTRACT OF THE DISCLOSURE

A pneumatic stimulator cushion having a series of cells which expand and contract seriatim as air under pressure is introduced from one end to the other end of the cushion and then exhausted back through the intake end, alternately in a predetermined cycle; the cells are connected by restricted openings between the cells so that the introduction or exhausting of air occurs in a progressive manner, which causes expansion or contraction of the overall bladder assembly, resulting in an undulating effect in both the vertical and horizontal planes of the cushion.

Brief summary of the invention

The primary object of the invention is to provide a stimulator to be used in cushions and the term "cushion" as herein used is intended to include seat cushions as well as other supports such as mattresses on which a person rests for a considerable period, and particularly in circumstances where a person is compelled to remain in the same position, which causes discomfort. For instance, in modern jet aircraft, particularly the military types, space for seating is extremely limited and weight requirements are very stringent. This condition is aggravated by mandatory use of restraint devices such as lap belts and shoulder harnesses, which are necessary to secure the air crewman to his seat during the entire flight profile, which restricts the freedom to change body position to relieve any discomfort. Such flight profiles may be extended to hours and lack of air circulation as well as pressure points in the thigh and buttocks and back areas of the air crewman cause considerable discomfort. The same disadvantages to a certain extent apply also to long distance truck drivers and bus drivers. In general this invention would apply wherever immobility of any part of the body may cause discomfort. Such discomfort is relieved by stimulating blood circulation by pneumatically massaging the body areas which are in contact with the cushion. A further object is to provide massaging and coolant benefits by imparting undulating effect to the cushion progressively from front to back and then in reverse. The undulating effect is accomplished through a bladder so divided that air under pressure can be introduced and exhausted progressively from one end to the other and back respectively so as to create vertical and horizontal undulations according to the weight resting on the bladder. Further the exhause air is utilized through an air cell to be discharged for the purpose of ventilation at the surface of the cushion; suitable means being provided for cycling the operation of an electrically operated valve to control the introduction and withdrawal of the air under pressure from the bladder of the cushion at a predetermined rate.

Brief description of the several views of the drawings

FIG. 1 is a partly schematic and partly sectional view of the stimulator cushion and the related control device.

FIG. 2 is a front view of the control panel for the cycling device.

FIG. 3 is a cross-sectional view of the bladder of the cushion the section being taken on lines 3—3 of FIG. 1.

FIG. 4 is a view of the three way solenoid valve for controlling the cycling of the undulation of the bladder.

FIG. 5 is a cross-sectional view of the solenoid valve, taken on lines 5—5 of FIG. 4.

FIG. 6 is a wiring diagram of the electric control circuit.

FIG. 7 is an illustrative installation of this cushion on top of an aircraft survivor kit in an aircraft ejection seat.

FIG. 8 is a plan view of said installation on the aircraft ejector seat.

Detailed description

In its general organization the illustrative embodiment of the invention herein includes a bladder 1 formed by parallel cells 2 which are communicated by one another through suitably restricted passages 3 arranged alternately at opposite ends of adjacent cells, so as to result in a serpentine pattern of airflow extending from the front 4 to the back 6 of the bladder surface. On one end of the cell 2 at the back of the bladder 1 is an intake 7, which also operates as an exhaust.

The intake 7 is connected by a suitable intake conduit 8 to a cell port 9 of a solenoid actuated three way valve 11. An intake port 12 of the valve 11 is connected by suitable conduits to a pressure reducer-regulator 13 which latter is connected by a conduit 14 to a source of gaseous medium under pressure for instance in aircraft, air under pressure. The solenoid 15 of the solenoid valve 11 is actuated through electrical wiring 16 connected to a suitable electronic controller 17.

The bladder 1 has an air cell 18 superimposed on the entire area of the cells. An exhaust port 19 of the solenoid valve 11 is connected by a conduit 21 to a port 22 of said air cell 18 so as to conduct air exhausted from the cells 2 into the air cell 18. The air cell 18 has ventilating holes 23 through its top surface so as to allow the escape of the ventilating air.

The bladder 1, formed by the cells 2, is made of a synthetic cloth supporting an elastomer which is suitable for retaining the air at relatively low pressures and at a temperature range from minus 40 to plus 160° F. This material is resiliently compressible so that the cells 2 are capable of expanding and contracting as air is introduced or exhausted respectively. The cells 2 are integrally united by flat ribs 24 of the same material. The restricted passages 3 extend through the respective ribs 24. The air cell is formed by a top sheet 26 of the same material integrally united with the cells at each end but spaced from the tops of the cells 2. The port 22 leading into the air cell, in this illustration, is at the same end as but spaced from the intake 7.

A suitable relief valve 27 is provided on one of the cells 2 near the front. This is an adjustable relief valve adjusted to a predetermined pressure suitable for the comfort of the person occupying the seat, so that when, due to increasing altitude, the internal pressure in the cells increases, or when the person sitting on the bladder is of a weight in excess of a certain predetermined weight, the excess air under such increased pressure escapes through the relief valve 27 into the air cell 18 and thus normalizes the pressure in the bladder and also increases ventilation.

The solenoid actuated valve 11, in this illustration, has its intake port 12 and its capstan port 9 substantially opposite and controlled by a valve 28 on a valve seat 29. The valve stem 31 extends into the solenoid 15 which when energized pulls the stem upward and opens the valve 28 from the valve seat 29 thus opens the intake port 12 to the cell port 9 for inflating the cells 2. During this operation the valve stem 31 closes the exhaust port 19 by means of a compressible valve 32. When the solenoid 15 is deenergized, the valve 28 is seated on the valve seat 29 and it closes the intake port 12 but at the same time it moves the valve 32 away from the exhaust port 19 and it opens communication between the cell port 9 and the exhaust port 19 so that by reason of the weight on the seat, the air is expelled from the cells 2 and it is forced through the exhaust port 19 and conduit 21 through the air cell port 22 into the air cell 18 and then it escapes through the ventilating holes 23.

The cycling control 17 is of the usual electronic type. It contains a usual toggle switch 33 for turning the device on or off. The cyling control includes also a dial control 34 for varying the valve "off" time resistor 35 and, in this illustration, a screw adjustment 36 for varying the valve "on" time resistor 37. In other words, the electric control circuit has in it adjustable timing resistors 35 and 37 whereby the length of time that the solenoid is energized and then remains deenergized is preset.

In one of the practical applications of this device the bladder herein is placed on the regular cushion 38 on the usual aircraft survivor kit 39 of the type shown in United States Patent Nos. 2,992,798 or 3,107,370. The electric wiring and pneumatic connections are connected through a disconnect device of the type shown in United States Patent Nos. 3,038,472 or 3,185,148, so as to permit the undulating cushion to be removed together with the seat when the latter is ejected from the aircraft. The electrical control units is located conveniently on the front of the kit so as to facilitate the variation of the undulation cycle according to the comfort of the airman.

In aircraft the air under pressure may be obtained either as bleed air from a compressor in the aircraft or in some cases from ram air through apertures in the wings. A suitable auxiliary heat exchanger 41 is provided in such aircraft application to cool the air that may be bled from the compressor of the jet, for instance, or to heat the air which might come from the outside when ram air is utilized.

In operation the user turns the toggle switch 33 "on" whereupon the electronic cycling control 17 will alternately energize and deenergize the solenoid in the three way valve 11 so as to open the normally closed valve 28, thereby to inflate the cells 2 progressively from the rearmost cells 2 to the front cells which creates an undulating massaging effect. After a time, predetermined by the adjustment of the timing control, the valve 28 is closed and by reason of the weight of the person sitting on the cushion the air is exhausted from the cells progressively from the front to the rearmost cells seriatim. The air so exhausted is impelled through the exhaust port 19 into the air cells 18 and out through the ventilating holes 23 for cooling and ventilating. After a predetermined time the solenoid 15 is again energized and the operation is repeated. When cells 2 are inflated they expand and the expansion is both vertical and horizontal and the undulations are vertical and horizontal, the horizontal undulations being more pronounced when the bladder is pressed down by the weight of the user. The undulating effects created by the filling and the exhausting of air in this progressive manner give a massaging sensation on the seated occupant. Such massaging stimulates blood circulation of the capillaries on the thigh and buttocks area, or on the parts of the body resting on the cushion and thereby relieves pressure points, and thus relieves the discomfort of sitting for a prolonged period in a fixed position.

The electronic circiut control 17 shown in the wiring diagram in FIG. 5, in its operation not only controls the solenoid valve 11, but also can vary the length or duration of the "on" and "off" periods by adjusting the variable resistors 35 and 37 respectively. At the moment that power is applied to the circuit through the closing of the switch 33, the capacitor 43 begins to charge, developing an exponential wave form at about joint 44 of the line 46, until the voltage reaches the "peak point" of the injunction transistor 47, which latter then switches and discharges the capacitor 43 through another resistor 48. Due to the discharged current through the resistor 48 a short pulse is developed across the same and it is transferred by a transistor diode 49 to a junction point 51, from where the positive pulse is then applied to the base of silicon rectifier 52 causing the latter to switch "on," which results in power being applied through line 53 to the solenoid valve 11. At the instant that the rectifier 52 switches "on," power is applied to the solenoid valve 11, energizing the solenoid 15 and opening the valve 28. Also, at the same time, the power is applied at junction 54 through line 56 to charge capacitor 57 developing an exponential wave form at junction 58 and when this discharge reaches the "peak point" of a second unijunction transistor 59, it switches "on," discharging the silicon controlled rectifier 52 through resistor 61, and developing a positive pulse at junction 62, which effectively puts the charge at junction 62 and at junction 54 at the same potential, turning off the silicon controlled rectifier 52. Then the cycle described will start again. The important and critical point in timing is when the unijunction transistors 47 and 59 are switched "on," and this is determined by the time necessary to reach the "peak point" of said unijunction transistors. The time necessary to reach the "peak point" voltage is varied by changing its respective time constant by adjusting variable resistors 35 and 37 respectively.

I claim:
1. A stimulator cushion comprising
    (a) bladder divided into a series of cells extending over the area of the cushion and made of a resiliently yieldable material, and capable of expanding and contracting respectively when inflated and deflated,
    (b) restricted communicating means between adjacent cells to communicate said cells with one another in series from one end of said area to the other, and back,
    (c) means to alternately introduce a gaseous medium under pressure into the cell at one end of said area to progressively inflate said cells and to exhaust said medium through said cell to progressively deflate said cells respectively from one end to the other and back, thereby undulating said bladder both in vertical and horizontal planes relatively to said area of said cushion in accordance with the weight of the person bearing on said cushion.
2. The invention defined in claim 1 and
    (d) a relief valve on said bladder adjusted to compensate for increasing altitudes and weights bearing on said bladder, and maintain a predetermined pressure condition consistent with the comfort of the human body thereon.
3. The invention defined in claim 1 and
    (d) said resiliently yieldable material of the bladder being a synthetic cloth supporting an elastomer suitable for retaining air at relatively low pressures and at a broad range of temperatures.
4. The invention defined in claim 1 and
    (d) said cells being generally parallel and said communicating means being located to form a continuous passage through said cells in a serpentine pattern from one end of said area to the other end and back respectively when inflated and deflated.
5. The invention defined in claim 1 and
    (d) said gaseous medium being compressed air,
    (e) an aircell formed on the top of the cushion overlying said cells,
    (f) said aircell having ventilating apertures to exhaust air to the body resting on the cushion.
6. The invention defined in claim 5 and
    (g) means to direct the air exhausted from said cells into said aircell.
7. The invention defined in claim 1 and
    (d) said means to alternately introduce a gaseous medium under pressure including a cycling device comprising,
    (e) an electrically actuated threeway valve having an intake port connected to a source of said medium under pressure, a cell port connected to said cell at one end of said bladder, and an exhaust port, (f) a timing device to actuate said valve alternately to communicate said cell valve port with said intake valve port and with said exhaust valve port thereby to alternately introduce and exhaust the medium under pressure from said cells.

8. The invention defined in claim 7, and (g) said gaseous medium being compressed air, (h) a ventilating aircell formed on said cushion, (i) said exhaust valve port being connected to said aircell, (j) said aircell having apertures for the escape of the exhausted air from said aircell for ventilating the surface of said cushion.

9. The invention defined in claim 1, and (d) said cells being generally parallel and said communicating means being located to form a continuous passage through said series of cells substantially in a serpentine pattern from one end of said cushion area to the other end and back respectively during inflation and deflation of said cells, (e) said resiliently yieldable material of the bladder being a synthetic cloth supporting an elastomer suitable for retaining air at relatively low pressures and at a broad temperature range, (f) said gaseous medium being compressed air, (g) an aircell formed on the top of the cushion overlying said cells, (h) said aircell having ventilating apertures to exhaust air to the body resting on the cushion, (i) and means to direct the air exhausted from said cells into said aircell.

10. The invention defined in claim 9, and (j) said means to alternately introduce a gaseous medium under pressure including a cycling device comprising, (k) an electrically actuated threeway valve having an intake port connected to a source of said medium under pressure, a cell port connected to said cell at one end of said bladder, and an exhaust port connected to said air directing means, (l) a timing circuit to actuate said valve alternately to communicate said cell valve port with said intake valve port and with said exhaust valve port thereby to alternately introduce and exhaust the medium under pressure from said cells.

References Cited
UNITED STATES PATENTS

| | | | |
|---|---|---|---|
| 254,265 | 2/1882 | Bone | 5—349 |
| 585,834 | 6/1897 | Ruth | 5—349 |
| 1,795,893 | 3/1931 | Rosett | 128—640 XR |
| 2,437,006 | 3/1948 | Simpson | 128—33 |
| 2,741,780 | 4/1956 | Kimbrig | 5—349 XR |
| 2,856,147 | 10/1958 | Knapp | 128—330 XR |
| 2,880,721 | 4/1959 | Corcoran | 128—64 |
| 2,998,817 | 9/1961 | Armstrong | 128—33 |

L. W. TRAPP, *Primary Examiner.*

U.S. Cl. X.R.

128—33